United States Patent [19]

Murphy et al.

[11] Patent Number: 5,073,867
[45] Date of Patent: Dec. 17, 1991

[54] DIGITAL NEURAL NETWORK PROCESSING ELEMENTS

[75] Inventors: John H. Murphy; Terry A. Jeeves, both of Penn Hills Township, Allegheny County, Pa.

[73] Assignee: Westinghouse Electric Corp., Pittsburgh, Pa.

[21] Appl. No.: 416,626

[22] Filed: Oct. 3, 1989

Related U.S. Application Data

[63] Continuation-in-part of Ser. No. 364,475, Jun. 12, 1989.

[51] Int. Cl.$^5$ .................................... G06F 15/18
[52] U.S. Cl. ............................................ 395/27
[58] Field of Search ................................ 364/513

[56] References Cited

PUBLICATIONS

An Introduction to Computing with Neural Nets; IEEE ASSP Magazine; Apr. 1987; Lippmann; pp. 4-21.

*Primary Examiner*—Allen R. MacDonald
*Attorney, Agent, or Firm*—M. P. Lynch

[57] ABSTRACT

A preprocessing device is disclosed which performs a linear transformation or power series expansion transformation on the input signals to a neural network node. The outputs of the preprocessing device are combined as a product of these linear transformations and compared to a threshold. This processing element configuration, combining a transformation with a product and threshold comparison, performs non-linear transformations between input data and output results. As a result, this processing element will, by itself, produce both linearly and non-linearly separable boolean logic functions. When this processing element is configured in a network, a two layer neural network can be created which will solve any arbitrary decision making function. This element can be configured in a probability based binary tree neural network which is validatable and verifiable in which the threshold comparison operation can be eliminated. The element can also be implemented in binary logic for ultra high speed. If the linkage element performs the power series expansion, a universal or general purpose element is created.

14 Claims, 15 Drawing Sheets

DIGITAL NEURAL NETWORK PROCESSING ELEMENTS

CROSS REFERENCES TO RELATED APPLICATIONS

This application is a continuation-in-part of U.S. Ser. No. 07/364,475 filed Jun. 12, 1989 and entitled Probabilistic Reasoning System, and is related to U.S. application entitled Probabilistic Reasoning System With Enhanced Capabilities And Improved Precision by John H. Murphy, Terry A. Jeeves, D. Kenneth McLain, having U.S. Ser. No. 416,622 and U.S. application entitled Neural Network Optimization Method by John H. Murphy and Terry A. Jeeves, having U.S. Ser. No. 416,563, all of which are incorporated by reference herein.

BACKGROUND OF THE INVENTION

The present invention is directed to a neural network and neural network processing elements which are based on probability and, more particularly, is directed to a network with a neural node which produces an output as a product of linearly transformed or power series expanded input signals.

A neural network consists of a multitude of massively, sometimes completely, interconnected processing elements. The interconnection of these processing elements may be structured, but this is not a necessary requirement for these arrangements to be referred to as neural networks. The processing elements can be organized into layers, columns, trees, rings, stars etc. dependent on the problem to be solved and the available resources All processing elements in a neural network need not be identical. This feature allows processing element configurations to be specialized to perform some specific functions within the network, such as input or output functions. Conventional neural networks 8 are formed from processing elements which deal with boolean signals and are generally structured in layers as illustrated in FIG. 1. The signals can represent the elements of a picture in a pattern recognition network, states of devices in a process control systems network and any other signals or values which are operated on by neural networks and expert systems. A neural network consists of several layers, an input layer 10 which includes plural input nodes 12, an output layer 14 which includes plural output nodes 16 and, in order to solve complex problems, that is, problems which are not linearly separable, the conventional neural network 8 usually includes one or more layers 18-22 between the input 10 and output 14 layers which, because of their location within the network, are often referred to as hidden layers. Each of the hidden layers also includes nodes 24 and 26. In principle, there can be more than one hidden layer in the network 8. Additional hidden layers increase the amount of serial processing in the network, but can clarify the resultant solution produced by the network 8. It has been theoretically shown that any arbitrary function can be formed or problem solved in a network with only a single hidden layer, therefore, the conventional three layer neural network has all the features necessary for developing fault tolerant solutions to any arbitrary problem. The conventional neural network 8 also includes a training layer 28 with training nodes 30 which allow the neural network 8 to learn the patterns which are to be recognized. Conventional neural network processing is simply based on taking the inner product of a weight vector and the input vector and testing this value against some threshold. FIG. 2 illustrates the conventional neural network processing element structure or node where this type of processing element is used in all layers of the network including the input and output layers. This node 40 includes a linkage element 42 or algorithm which produces a linkage output signal by multiplying the linkage input signal $x_i$ by a weight $A_i$ as illustrated in equation 1:

$$y_i = A_i x_i \tag{1}$$

The linkage weight $A_i$ can be either positive or negative depending on whether the connection between the processing elements is excitory or inhibitory. These linkage output signals $y_i$ are summed and compared to a threshold $\Theta$ as illustrated in equation 2:

$$y = \sum_{i=1}^{n} y_i \geq \Theta = \sum_{i=1}^{n} A_i x_i \geq \Theta \tag{2}$$

This conventional algorithm allows one to reason with weighted information, a classical method of decision making. Such an algorithm is commonly referred to as a weighted summation and each node is sometimes called a perceptron because of its ability to perceive patterns. The weighted summation algorithm, by itself, is a statistical procedure usually used to consolidate a multitude of related raw data into a single datum. This process is very useful in performing multi-sensor fusion at the input layer (10) of a neural network. This process is also very useful in formulating a consensus from several decision making sources at the output layer (14) of a neural network. Since conventional neural network seal only with boolean signals, the result of this consolidation by weighted summation must be transformed back into a boolean signal. This is done in the above algorithm by comparing the weighted summation y with the threshold $\Theta$, and returning a 0 (false) if the inequality is invalid or a 1 (true) if the inequality is valid. The simple threshold function described above can be replaced with a complex threshold function such as a sigmoid function which operates on the output from the summation element 44 by the transfer function comparison element 46. During the training phase different back propagation of error training algorithms have been used by a weight calculation unit 48 to adjust the weights $A_i$ applied to the input signals of each node.

The function of equation 2 does not include an offset because an offset is redundant. Any offset can be simply absorbed into the threshold or threshold value $\Theta$ because of the presence of addition. A single summation threshold processing element cannot generate every possible boolean logic function. For example, for the two input case the summation threshold function can only generate 14 (the linearly separable functions) of the 16 possible functions and is incapable of generating either the Exclusive-OR or the Equivalence (Exclusive-NOR) functions, the non-linearly separable functions, as illustrated in Table 1, where Z is the set (false, true):

TABLE 1

| Function | Summation Threshold Case of Two Inputs | | | | | |
|---|---|---|---|---|---|---|
| | $Z = \{0,1\}$ | | | $Z = \{-1,1\}$ | | |
| | $A_x$ | $A_y$ | $\Theta$ | $A_x$ | $A_y$ | $\Theta$ |
| TRUE | 0 | 0 | −1 | 0 | 0 | −1 |
| FALSE | 0 | 0 | 1 | 0 | 0 | 1 |
| x | 1 | 0 | 1 | 1 | 0 | 1 |
| y | 0 | 1 | 1 | 0 | 1 | 1 |
| NOT x | 1 | 0 | 0 | −1 | 0 | 1 |
| NOT y | 0 | 1 | 0 | 0 | −1 | 1 |
| x AND y | 1 | 1 | 2 | 1 | 1 | 1 |
| (NOT x) AND y | −1 | 1 | 1 | −1 | 1 | 1 |
| x AND (NOT y) | 1 | −1 | 1 | 1 | −1 | 1 |
| (NOT x) AND (NOT y) | −1 | −1 | 0 | −1 | −1 | 1 |
| x OR y | 1 | 1 | 1 | 1 | 1 | −1 |
| (NOT x) OR y | −1 | 1 | 0 | −1 | 1 | −1 |
| x OR (NOT y) | 1 | −1 | 0 | 1 | −1 | −1 |
| (NOT x) OR (NOT y) | −1 | −1 | −1 | −1 | −1 | −1 |
| x XOR y | Impossible | | | Impossible | | |
| x EQV y | Impossible | | | Impossible | | |

The inability of equation 2 to generate all possible boolean functions is not a practical problem when these elements are used in a network with a plurality of layers, since a combination of these elements is capable of generating any arbitrary logic function. This follows from the fact that a single summation threshold processing element can generate the universal logic element NOR, the universal logic element NAND and the complete set of key primitive boolean logic functions, AND, OR and NOT.

The number of boolean logic functions which a single conventional processing element can emulate grows rapidly with the number of inputs, as illustrated in the third column of Table 2:

TABLE 2

A Comparison of the Number of Boolean Logic Functions for a General-Purpose Processing Element Versus a Perceptron

| | Number of Outputs | |
|---|---|---|
| Number of Inputs | General-Purpose Processing Element | Perceptron Processing Element |
| 1 | 4 | 4 |
| 2 | 16 | 14 |
| 3 | 256 | 104 |
| 4 | 65,536 | 1882 |
| 5 | $2^{32} \sim 4 \cdot 10^9$ | 93,852 |
| 6 | $2^{64} \sim 10^{19}$ | $\sim 1.4 \cdot 10^7$ |

Table 2 compares the maximum possible number of boolean logic functions which a hypothetical general purpose processing element can generate with the actual number of boolean logic functions which a conventional node, or perceptron, can generate (the linearly separable functions), for 1 to 6 inputs. Table 2 illustrates that for greater than three inputs, the hypothetical general purpose processing element generates a substantially larger number of boolean logic functions (as indicated in the general purpose processing element column) than the conventional device (listed in the perceptron column) but does not necessarily generate all the boolean functions. This suggests that a more powerful processing element, such as a hypothetical general purpose processing element, for building compact, high speed neural networks would be one which is specifically tailored to generate non-linearly separable boolean logic functions.

SUMMARY OF THE INVENTION

It is an object of the present invention to improve conventional neural network nodes with a probability based linear transformation linkage element.

It is another object of the present invention to provide a more powerful neural network processing element based on probability which performs a product of linear transformations.

It is also an object to provide a neural network threshold element which tests against the product.

It is a further object of the present invention to provide a more powerful processing element which will generate boolean functions, both linearly separable and non-linearly separable.

It is another object of the present invention to provide a neural network node which will allow the implementation of two layer neural networks.

When a power series expansion element is used, it is an object to provide a general purpose or universal neural network processing element.

The above objects can be accomplished by a device for preprocessing which performs a linear transformation on the input signals. The outputs of the preprocessing device are combined as the product of these linear transformations. The product is then threshold tested. This processing element configuration is unique in that it performs non linear transformations between input data and output results. As a result, this processing element will, by itself, produce linearly and non-linearly separable boolean logic functions. When this processing element is used a two layer neural network can be created which will solve any arbitrary decision making problem. When a power series expansion is used in preprocessing a general purpose processing element is produced.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 3:
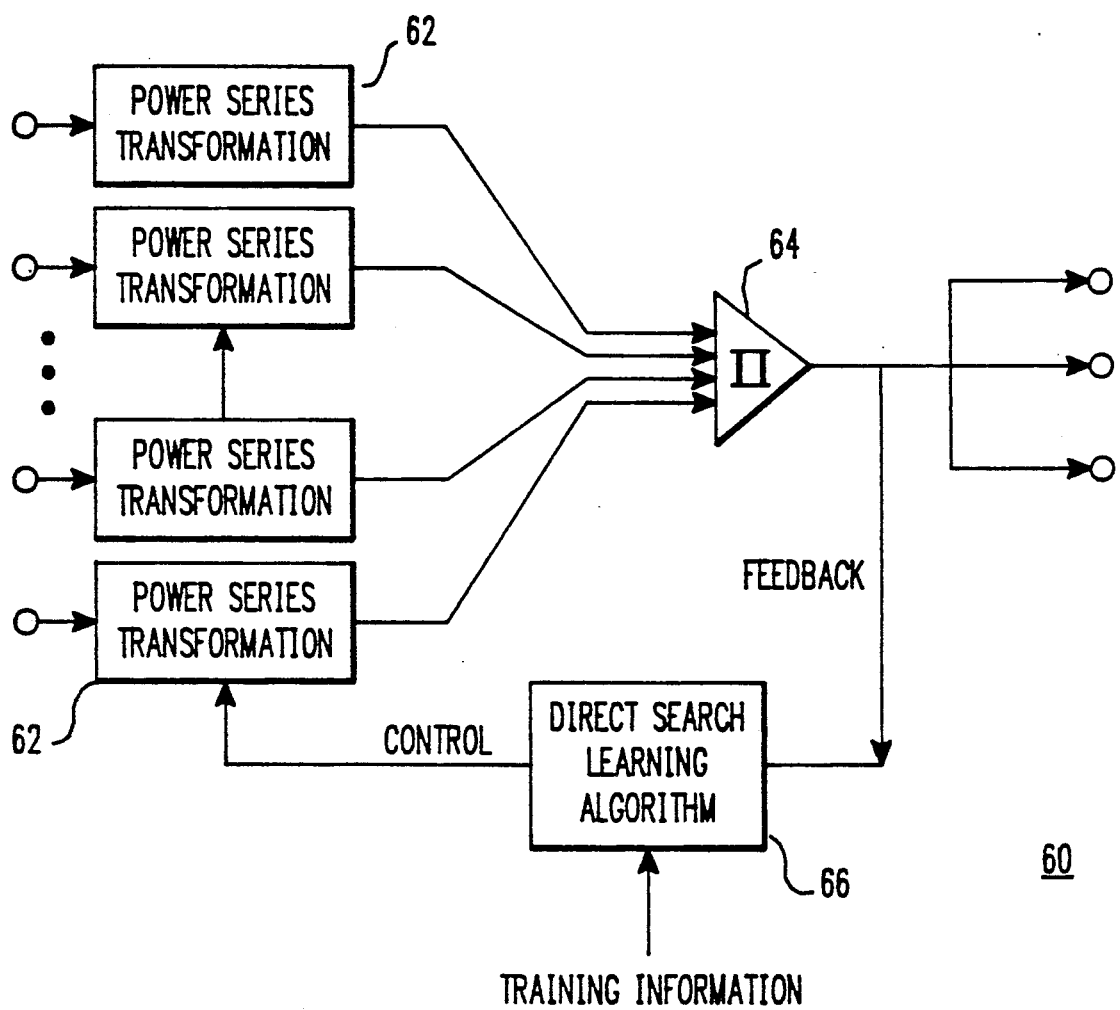
FIG. 3 illustrates a neural node in accordance with the present invention.

The neural network nodes and the network itself as described herein are based on the probabilistic expert reasoning system technology described in the parent and related application previously mentioned. The neural node 60, as illustrated in FIG. 3, includes an improved linkage algorithm or element in which a simple implication or linear transformation is performed. The algorithm for simple implications determines the linkage output signal $y_i$ by multiplying the linkage input signal $x_i$ by a weight $A_i$ and adding an offset as set forth in equation 3:

$$y_i = A_i x_i + B_i \qquad (3)$$

The linkage offset is necessary to work with probabilities. Without the linkage offset, $B_i = 0$, this algorithm or element reduces to the linkage element of the prior art as illustrated in equation 1. The algorithm or element 62 used for complex implications determines the linkage output signal $y_i$ by performing a power series transformation on the incoming signal $x_i$ as set forth in equation 4:

$$y_i = \sum_k A_{ik} x_i^k \qquad (4)$$

This algorithm reduces to the conventional neural network linkage algorithm when $A_{ik} = 0$ for k not equal to 1. This algorithm or element reduces to the simple implication algorithm when $A_{ik} = 0$ for k to greater than 1. The more complex linkage algorithm provides greater precision and thus allows better decision making. The discrete component, software and dedicated processor implementations of the linear transformation (equation 3) and power series expansion (equation 4) which produce the linkage outputs can be found in the applications incorporated by reference herein. Both of the above linkage algorithms or elements will also improve the decision making of the conventional nodes when used in the conventional linkage element 42.

When a neural network with the improved linkage algorithm or element 62 is simulated on a serial processing system, the improved reasoning capability incurs a penalty of increased computation. However, when the neural network is implemented using the probabilistic reasoning system of the application previously mentioned, the improved reasoning capability is obtained at substantially no cost. In any specific application, the number of terms in the linkage algorithm or element using the power series expansion is chosen after balancing the two conflicting requirements of 1. maximizing the number of processing elements by decreasing the complexity, and 2. obtaining more accurate solutions by increasing the complexity.

The processing element must combine the signals from two or more linkage units 62. As previously discussed conventional neural networks perform a threshold or sigmoid function on the sum of the incoming signals. The approach of the present invention has a firm foundation in probability theory, which is a major difference between conventional neural networks and neural networks in accordance with the present invention. The element 64 which combines the linkage signals in the present invention takes the product of the linearly transformed multi-bit input signals. This formulation directly corresponds to the rules for evidential propagation based on probability theory. The algorithm or element (node) 60 for probability based neural network processing performs:

$$y = \prod_{i=1}^{n} y_i = \prod_{i=1}^{n} (A_i x_i + B_i) \geq \Theta = \prod_{i=1}^{n} \sum_{k=1}^{m} A_{ik} x_i^k \geq \Theta \qquad (5)$$

The coefficients A and B can be determined by using the approach of the parent application, by the optional approach of the related application or by examining the tables set forth herein. The components of this element, as previously mentioned, are illustrated in FIG. 3. This neural node element 60 can include linear transformation elements for linkage in accordance with equation 3 or power series transformation units 62 (as shown) which perform the functions of equation 4 and includes a product unit 64. These units can be implemented using hardware or software elements described in more detail in the related applications. The threshold comparison operation of equation 5 in a discrete component version can be performed by a register storing the threshold and a conventional discrete multibit comparator. In a software implementation the comparison would be performed by a conventional comparison step. In a dedicated processor a multibit comparator and register can also be used. The output signal of the processing element 64 is fed back through a learning algorithm 66 which will be discussed in more detail later. This element 60 performs the function of equation 5. This element 60 is suitable for the hidden layer nodes 24/26 of the conventional network 8. By substituting this nodal element for the conventional nodal element, this single product threshold element, by itself can generate every possible boolean logic output function for a dyadic processing element as illustrated in Table 3.

TABLE 3

Product Threshold Case of Two Inputs

| Function | Z = {0,1} | | | | | Z = {−1,1} | | | | |
|---|---|---|---|---|---|---|---|---|---|---|
| | $A_x$ | $B_x$ | $A_y$ | $B_y$ | $\Theta$ | $A_x$ | $B_x$ | $A_y$ | $B_y$ | $\Theta$ |
| TRUE | 0 | 0 | 0 | 0 | −1 | 0 | 0 | 0 | 0 | −1 |
| FALSE | 0 | 0 | 0 | 0 | 1 | 0 | 0 | 0 | 0 | 1 |
| x | 2 | −1 | 0 | 1 | 1 | 1 | 0 | 0 | 1 | 1 |

TABLE 3-continued

| | Product Threshold Case of Two Inputs | | | | | | | | | |
|---|---|---|---|---|---|---|---|---|---|---|
| | $Z = \{0,1\}$ | | | | | $Z = \{-1,1\}$ | | | | |
| Function | $A_x$ | $B_x$ | $A_y$ | $B_y$ | $\Theta$ | $A_x$ | $B_x$ | $A_y$ | $B_y$ | $\Theta$ |
| y | 0 | 1 | 2 | −1 | 1 | 0 | 1 | 1 | 0 | 1 |
| NOT x | −2 | 1 | 0 | 1 | 1 | −1 | 0 | 0 | 1 | 1 |
| NOT y | 0 | 1 | −2 | 1 | 1 | 0 | 1 | −1 | 0 | 1 |
| x AND y | 2 | 0 | 2 | 0 | 1 | 1 | 1 | 1 | 1 | 1 |
| (NOT x) AND y | −2 | 2 | 2 | 0 | 1 | −1 | 1 | 1 | 1 | 1 |
| x AND (NOT y) | 2 | 0 | −2 | 2 | 1 | 1 | 1 | −1 | 1 | 1 |
| (NOT x) AND (NOT y) | −2 | 2 | −2 | 2 | 1 | −1 | 1 | −1 | 1 | 1 |
| x OR y | 2 | −2 | −2 | 2 | −1 | 1 | −1 | −1 | 1 | −1 |
| (NOT x) OR y | −2 | 0 | −2 | 2 | −1 | −1 | −1 | −1 | 1 | −1 |
| x OR (NOT y) | 2 | −2 | 2 | 0 | −1 | 1 | −1 | 1 | 1 | −1 |
| (NOT x) OR (NOT y) | −2 | 0 | 2 | 0 | −1 | −1 | −1 | 1 | 1 | −1 |
| x XOR y | −2 | 1 | 2 | −1 | 1 | −1 | 0 | 1 | 0 | 1 |
| x EQV y | 2 | −1 | 2 | −1 | 1 | 1 | 0 | 1 | 0 | 1 |

As illustrated by Table 3 the implementation of the product threshold function illustrated in equation 5 forms a very robust product threshold element.

The implementation of equation 5 with offsets requires a large number of coefficients requiring a large amount of storage. The large number can be reduced by dropping the B coefficient resulting in a product threshold function without offsets as set forth in equation 6:

$$y = \prod_{i=1}^{n} A_i x_i \geq \Theta \quad (6)$$

This element takes the product of each input with a corresponding weight and then forms a product of these weighted inputs. This element generates an output b comparing the value of the resultant product with the threshold value. This element can be implemented with a subset of the devices or steps previously mentioned.

because it produces a NAND: x NAND y=(NOT x) OR (NOT y) whereas, when $Z=[-1, 1]$ the parity is even and this product threshold function is not universal.

Conventional expert systems have introduced a new type of logic often referred to as fuzzy logic which is based on replacing the logical operation by extrema functions. Two types of extrema threshold functions, the minimum and maximum threshold functions, are natural extensions of the fuzzy logic theory. The maximum threshold element represented in the terms of the present invention is illustrated in equation 7:

$$y = MAX[A_i x_i + B_i] \geq \Theta \quad (7)$$

This equation makes a simple linear transformation of each input and then finds the maximum value. The output is generated by comparing the value of this result with a threshold value. This element can be imple-

TABLE 4

| | Product Threshold Without Offsets Case of Two Inputs | | | | | |
|---|---|---|---|---|---|---|
| | $Z = \{0,1\}$ | | | $Z = \{-1,1\}$ | | |
| Function | $A_x$ | $A_y$ | $\Theta$ | $A_x$ | $A_y$ | $\Theta$ |
| TRUE | 0 | 0 | −1 | 0 | 0 | −1 |
| FALSE | 0 | 0 | 1 | 0 | 0 | 1 |
| x | | Impossible | | | Impossible | |
| y | | Impossible | | | Impossible | |
| NOT x | | Impossible | | | Impossible | |
| NOT y | | Impossible | | | Impossible | |
| x AND y | 1 | 1 | 1 | | Impossible | |
| (NOT x) AND y | | Impossible | | | Impossible | |
| x AND (NOT y) | | Impossible | | | Impossible | |
| (NOT x) AND (NOT y) | | Impossible | | | Impossible | |
| x OR y | | Impossible | | | Impossible | |
| (NOT x) OR y | | Impossible | | | Impossible | |
| x OR (NOT y) | | Impossible | | | Impossible | |
| (NOT x) OR (NOT y) | −1 | 1 | 0 | | Impossible | |
| x XOR y | | Impossible | | −1 | 1 | 1 |
| x EQV y | | Impossible | | 1 | 1 | 1 |

As illustrated in Table 4, for a dyadic processing element, the product threshold function of equation 6 without offsets generates only 4 boolean functions, and which 4 boolean functions depends on the values selected for true and false. In a network of processing elements, this product threshold function is sometimes a universal function dependent on the parity of the selected true-false representation. For example, when $Z=[0,1]$, the parity is odd, this function is universal mented using the linkage elements previously mentioned and a first register which stores the previous maximum value which is compared using a conventional comparator or comparison step, with the largest of the two being stored in the first register. The comparator or step would be used again with contents of a second register storing the threshold to make the final comparison.

TABLE 5

| | Maximum Threshold with Offsets Case of Two Inputs | | | | | | | | | |
|---|---|---|---|---|---|---|---|---|---|---|
| | Z = {0,1} | | | | | Z = {−1,1} | | | | |
| Function | $A_x$ | $B_x$ | $A_y$ | $B_y$ | $\Theta$ | $A_x$ | $B_x$ | $A_y$ | $B_y$ | $\Theta$ |
| TRUE | 0 | 0 | 0 | 0 | −1 | 0 | 0 | 0 | 0 | −1 |
| FALSE | 0 | 0 | 0 | 0 | 1 | 0 | 0 | 0 | 0 | 1 |
| x | 2 | −1 | 0 | 0 | 1 | 1 | 0 | 0 | 0 | 1 |
| y | 0 | 0 | 2 | −1 | 1 | 0 | 0 | 1 | 0 | 1 |
| NOT x | −2 | 1 | 0 | 0 | 1 | −1 | 0 | 0 | 0 | 1 |
| NOT y | 0 | 0 | −2 | 1 | 1 | 0 | 0 | −1 | 0 | 1 |
| x AND y | | | Impossible | | | | | Impossible | | |
| (NOT x) AND y | | | Impossible | | | | | Impossible | | |
| x AND (NOT y) | | | Impossible | | | | | Impossible | | |
| (NOT x) AND (NOT y) | | | Impossible | | | | | Impossible | | |
| x OR y | 2 | −1 | 2 | −1 | 1 | 1 | 0 | 1 | 0 | 1 |
| (NOT x) OR y | −2 | 1 | 2 | −1 | 1 | −1 | 0 | 1 | 1 | 1 |
| x OR (NOT y) | 2 | −1 | −2 | 1 | 1 | 1 | 0 | −1 | 0 | 1 |
| (NOT x) OR (NOT y) | −2 | 1 | −2 | 1 | 1 | −1 | 0 | −1 | 0 | 1 |
| x XOR y | | | Impossible | | | | | Impossible | | |
| x EQV y | | | Impossible | | | | | Impossible | | |

As illustrated in Table 5, the maximum threshold function generates only 10 boolean functions for a dyadic processing element.

Once again the large number of coefficients necessary, and the corresponding storage, can be reduced by dropping the B coefficients. The resulting maximum threshold without an offset is set forth in equation 8.

$$y = MAX[A_i x_i] \geq \Theta \qquad (8)$$

This element or algorithm takes the product of each input with a corresponding weight and then finds the maximum value. The output is generated by comparing the value of this result with the threshold value. A subset of the previous components will implement this node.

TABLE 6

| | Maximum Threshold without Offsets Case of Two Inputs | | | | | |
|---|---|---|---|---|---|---|
| | Z = {0,1} | | | Z = {−1,1} | | |
| Function | $A_x$ | $A_y$ | $\Theta$ | $A_x$ | $A_y$ | $\Theta$ |
| TRUE | 0 | 0 | −1 | 0 | 0 | −1 |
| FALSE | 0 | 0 | 1 | 0 | 0 | 1 |
| x | 1 | −1 | 1 | 1 | 0 | 0 |
| y | −1 | 1 | 1 | 0 | 1 | 0 |
| NOT x | | Impossible | | −1 | 0 | 0 |
| NOT y | | Impossible | | 0 | −1 | 0 |
| x AND y | | Impossible | | | Impossible | |
| (NOT x) AND y | | Impossible | | | Impossible | |
| x AND (NOT y) | | Impossible | | | Impossible | |
| (NOT x) AND (NOT y) | | Impossible | | | Impossible | |
| x OR y | 1 | 1 | 1 | 1 | 1 | 1 |
| (NOT x) OR y | | Impossible | | −1 | 1 | 1 |
| x OR (NOT y) | | Impossible | | 1 | −1 | 1 |
| (NOT x) OR (NOT y) | −1 | −1 | 0 | −1 | −1 | 1 |
| x XOR y | | Impossible | | | Impossible | |
| x EQV y | | Impossible | | | Impossible | |

As illustrated in Table 6, the maximum threshold function without offsets generates either 10 or 6 boolean functions where the boolean functions generated depend upon the values selected for true and false. In either case, since the threshold function includes the NAND, it is a universal element in a network of these processing elements.

The minimum threshold function in the probability theory terminology of the present invention is implemented using equation 9.

$$y = MIN[A_i x_i + B_i] \geq \Theta \qquad (9)$$

This element or algorithm forms a simple linear transformation of each input and then finds the minimum value. It generates the output by comparing the value of this result with the threshold value. This element can be implemented using the components or steps previously discussed.

TABLE 7

| | Minimum Threshold with Offsets Case of Two Inputs | | | | | | | | | |
|---|---|---|---|---|---|---|---|---|---|---|
| | Z = {0,1} | | | | | Z = {−1,1} | | | | |
| Function | $A_x$ | $B_x$ | $A_y$ | $B_y$ | $\Theta$ | $A_x$ | $B_x$ | $A_y$ | $B_y$ | $\Theta$ |
| TRUE | 0 | 0 | 0 | 0 | −1 | 0 | 0 | 0 | 0 | −1 |
| FALSE | 0 | 0 | 0 | 0 | 1 | 0 | 0 | 0 | 0 | 1 |
| x | 2 | −1 | 0 | 0 | 0 | 1 | 0 | 0 | 0 | 0 |
| y | 0 | 0 | 2 | −1 | 0 | 0 | 0 | 1 | 0 | 0 |
| NOT x | −2 | 1 | 0 | 0 | 0 | −1 | 0 | 0 | 0 | 0 |
| NOT y | 0 | 0 | −2 | 1 | 0 | 0 | 0 | −1 | 0 | 0 |

TABLE 7-continued

| | Minimum Threshold with Offsets Case of Two Inputs | | | | | | | | | |
|---|---|---|---|---|---|---|---|---|---|---|
| | Z = {0,1} | | | | | Z = {−1,1} | | | | |
| Function | $A_x$ | $B_x$ | $A_y$ | $B_y$ | $\Theta$ | $A_x$ | $B_x$ | $A_y$ | $B_y$ | $\Theta$ |
| x AND y | 2 | −1 | 2 | −1 | 1 | 1 | 0 | 1 | 0 | 1 |
| (NOT x) AND y | −2 | 1 | 2 | −1 | 1 | −1 | 0 | 1 | 0 | 1 |
| x AND (NOT y) | 2 | −1 | −2 | 1 | 1 | 1 | 0 | −1 | 0 | 1 |
| (NOT x) AND (NOT y) | −2 | 1 | −2 | 1 | 1 | −1 | 0 | −1 | 0 | 1 |
| x OR y | | | Impossible | | | | | Impossible | | |
| (NOT x) OR y | | | Impossible | | | | | Impossible | | |
| x OR (NOT y) | | | Impossible | | | | | Impossible | | |
| (NOT x) OR (NOT y) | | | Impossible | | | | | Impossible | | |
| x XOR y | | | Impossible | | | | | Impossible | | |
| x EQV y | | | Impossible | | | | | Impossible | | |

As illustrated in Table 7 the minimum threshold function generates only 10 boolean functions for a dyadic processing element including the NOR:x NOR y=(-NOT x) AND (NOT y) which makes it a universal element.

Once again the large number of coefficients can be reduced by dropping the B coefficients resulting in a minimum threshold function without offsets as set forth in equation 10.

$$y = \text{MIN}[A_i x_i] \geq \Theta \qquad (10)$$

This element or algorithm takes a product of each input with a corresponding weight and then finds the minimum value. The output is generated by comparing the value of this result with the threshold value. Once again the previous components or steps can be used to implement this node.

TABLE 8

| | Minimum Threshold without Offsets Case of Two Inputs | | | | | |
|---|---|---|---|---|---|---|
| | Z = {0,1} | | | Z = {−1,1} | | |
| Function | $A_x$ | $A_y$ | $\Theta$ | $A_x$ | $A_y$ | $\Theta$ |
| TRUE | 0 | 0 | −1 | 0 | 0 | −1 |
| FALSE | 0 | 0 | 1 | 0 | 0 | 1 |
| x | | Impossible | | 1 | 0 | 0 |
| y | | Impossible | | 0 | 1 | 0 |
| NOT x | −1 | 0 | 0 | −1 | 0 | 0 |
| NOT y | 0 | −1 | 0 | 0 | −1 | 0 |
| x AND y | 1 | 1 | 1 | 1 | 1 | 1 |
| (NOT x) AND y | | Impossible | | −1 | 1 | 1 |
| x AND (NOT y) | | Impossible | | 1 | −1 | 1 |
| (NOT x) AND (NOT y) | −1 | −1 | 0 | −1 | −1 | 1 |
| x OR y | | Impossible | | | Impossible | |
| (NOT x) OR y | | Impossible | | | Impossible | |
| x OR (NOT y) | | Impossible | | | Impossible | |
| (NOT x) OR (NOT y) | | Impossible | | | Impossible | |
| x XOR y | | Impossible | | | Impossible | |
| x EQV y | | Impossible | | | Impossible | |

As illustrated in Table 8, for a dyadic processing element, this minimum threshold function, algorithm or element produces either or 10 or 6 boolean functions, which boolean functions that are generated depend on the value selected for true and false. Since this threshold function includes the NOR, it is a universal element in a network of these processing elements.

Figure 4:
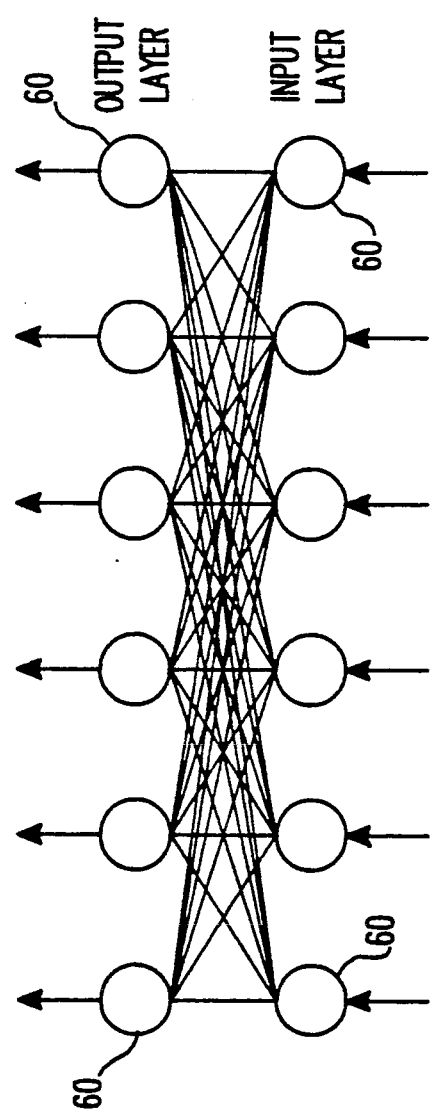
FIG. 4 depicts a two layer network in accordance with the present invention.

As previously mentioned a three layer network of conventional neural network elements (perceptrons) can solve any arbitrary decision making problem. The three layers have forced the neural network community to solve the problem of weight assignment for the hidden layer of processing elements using one of a number of back propagation of errors learning schemes. The source of this problem is the limitation of the conventional neural node elements to handling linearly separable problems. As previously discussed and shown in Table 3, the present invention provides a network element or node which is not limited to handling linearly separable problems but will handle non-linearly separable problems. As a result, the processing element of the present invention as set forth in equation 5 can perform all of the problem solving, decision making problems of the traditional three layer network in two layers as illustrated in FIG. 4. The present invention does not require a back propagation of errors routine to adapt weights because the hidden layer does not exist. The present invention can adapt the weights coming into the output layer using simple optimization routines such as the classical gradient descent or the preferred learning algorithm discussed later herein. The present invention allows the faster solution to any decision making problem because of the simplicity of the processing element, as illustrated in FIG. 3, and the reduction in the number of layers needed to solve the problem.

Figure 5:
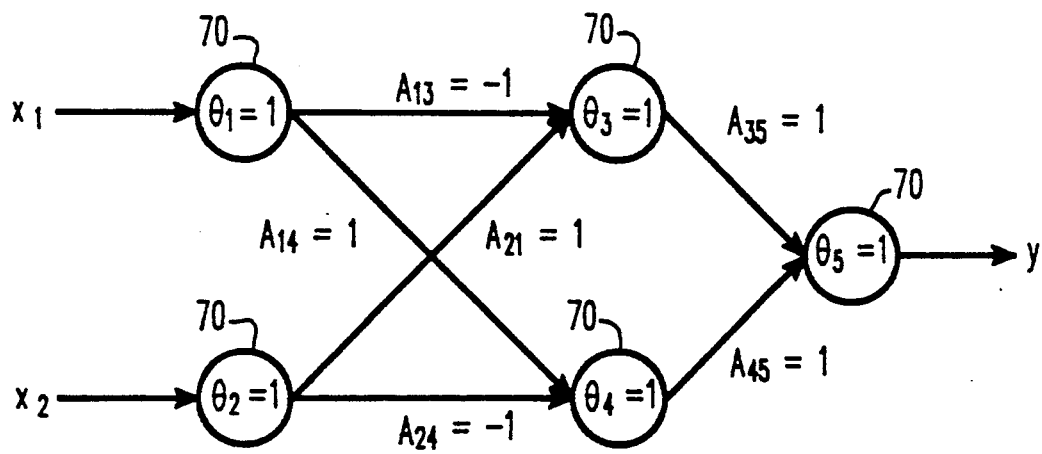
FIG. 5 illustrates a conventional 3 layer approach to providing the non-linearly separable function XOR.
Figure 6:
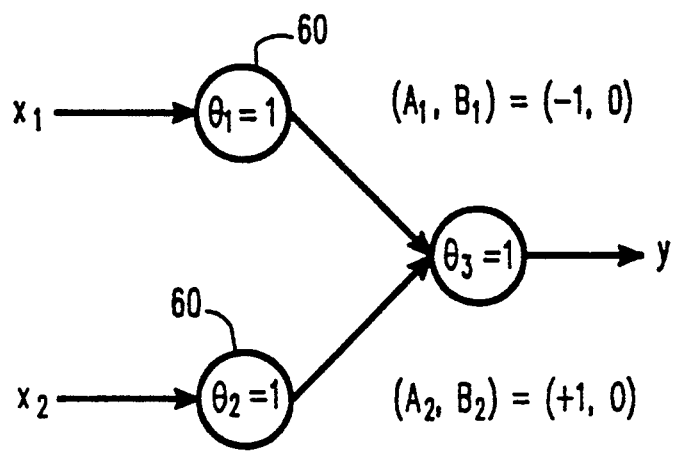
FIG. 6 illustrates a two layer to providing the XOR function using the present invention.

To illustrate the power of the invention, the classic Exclusive-Or problem will be used to demonstrate that the present invention can indeed produce a two layer solution to a non-linearly separable problem whereas the conventional neural network element needs a three layer network to solve this problem. FIG. 5 illustrates one solution to the Exclusive-Or problem using the conventional processing element executing equation 2. In this two bit Exclusive-Or neural network each node 70 in the first layer receives one of the bits equally weighted and each node 70 has the same threshold. In the second layer the weighting A provided for the inputs are different and the thresholds are the same. In the third layer the weights on the inputs are the same. As can be seen from this example three layers are necessary. FIG. 6 illustrates the same problem solved by a neural network using the processing element 60 of FIG. 3. In this solution the linear transformation weights and offsets in the first layer are the same for both single bit inputs. The node of the second layer applies different weights and offsets during the linkage linear transformation processing and multiplies the linkage outputs before comparison with the threshold.

Figure 7:
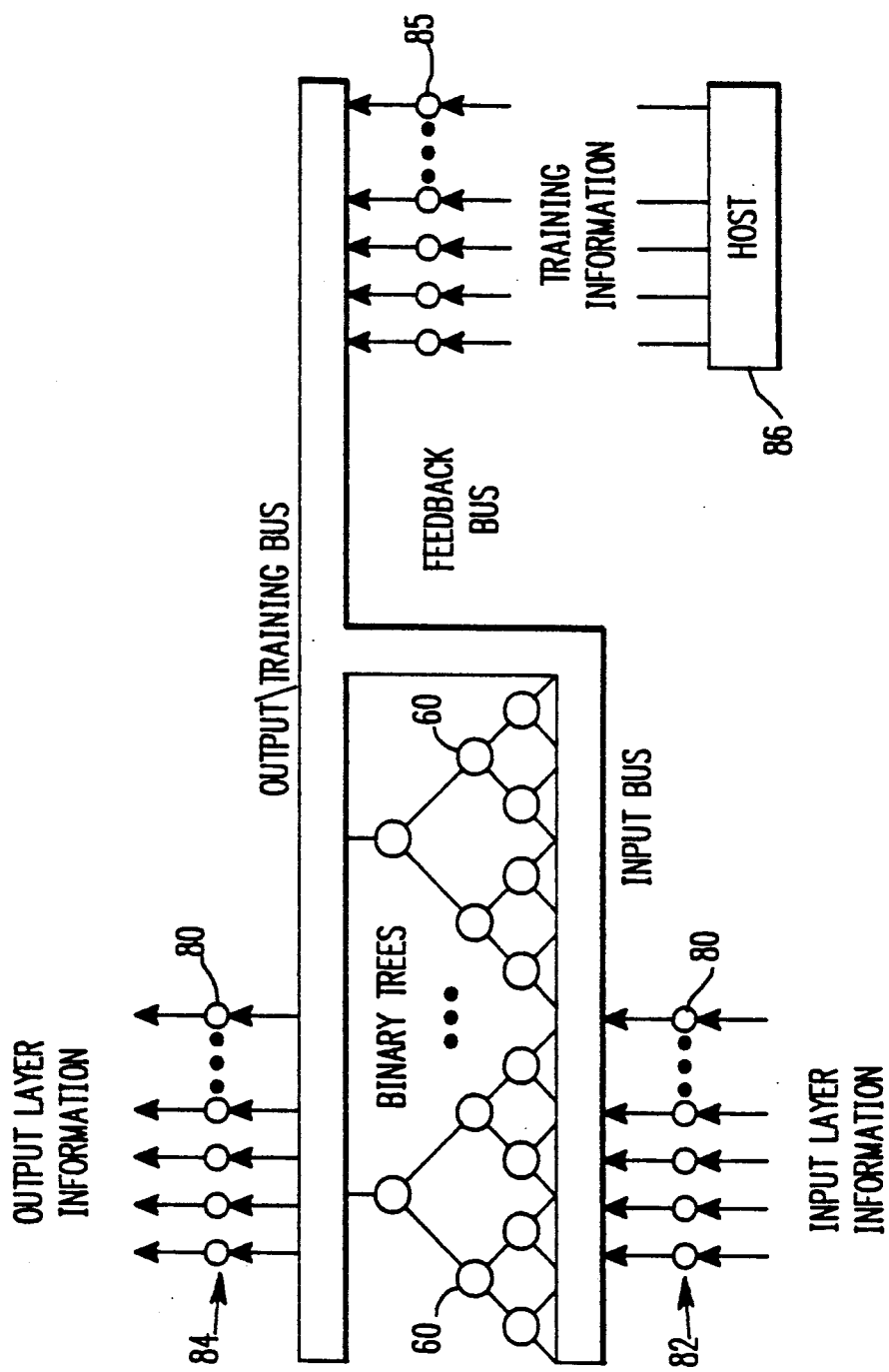
FIG. 7 illustrates a tree structure neural network.

It is also possible to implement the present invention structuring the neural nodes in binary decision trees with probability as inputs as illustrated in FIG. 7. Structures other than binary trees and layers such as ring, star or column networks can also be implemented with this embodiment. The binary tree structure is preferably implemented as described in the parent application. In such a situation the threshold comparison operation of equation 5 can be eliminated because the threshold functions of the decisions are being mapped into the tree architecture. The virtue of the probability based binary tree architecture is that it mathematically performs operations on information in accordance with the rules associated with probability theory. The combination of nodes which linearly transform inputs and combine the inputs using a product operation in a binary tree architecture with a learning method, such as the direct search, produces an adaptive probabilistic reasoning system. Such a probability based decision tree structure is inherently validatable and verifiable, unlike conventional neural networks and other expert systems structures. The system is capable of learning through the input of weights, by a host computer 86 through simple input storage nodes 85, that are produced by the direct pattern search learning algorithm. When using the node element 60 of FIG. 3 in a binary tree as illustrated in FIG. 7, the element 60, even though very powerful, is not suitable for the evidential consolidation at the input and output layers of a probability based binary tree network. As a result, a processing element 80 or algorithm suitable for combining information at the input 82 and output 84 layers is needed.

For assimilating raw input data and consolidating output results from several distinctly different lines of reasoning at the input/output layers of probability based networks such as illustrated in FIG. 7, a probability based weighted summation processing element which performs the function illustrated in equation 11

$$y = \sum_{i=1}^{n} (A_i y_i) \quad (11)$$

where $y_i$ can be a linear transformation or a power series expansion. To be valid as an input or output processing element the weights of equation 11 must be restricted as set forth in equation 12

$$\sum_{i=1}^{n} A_i \leq 1 \quad (12)$$

Figure 2:
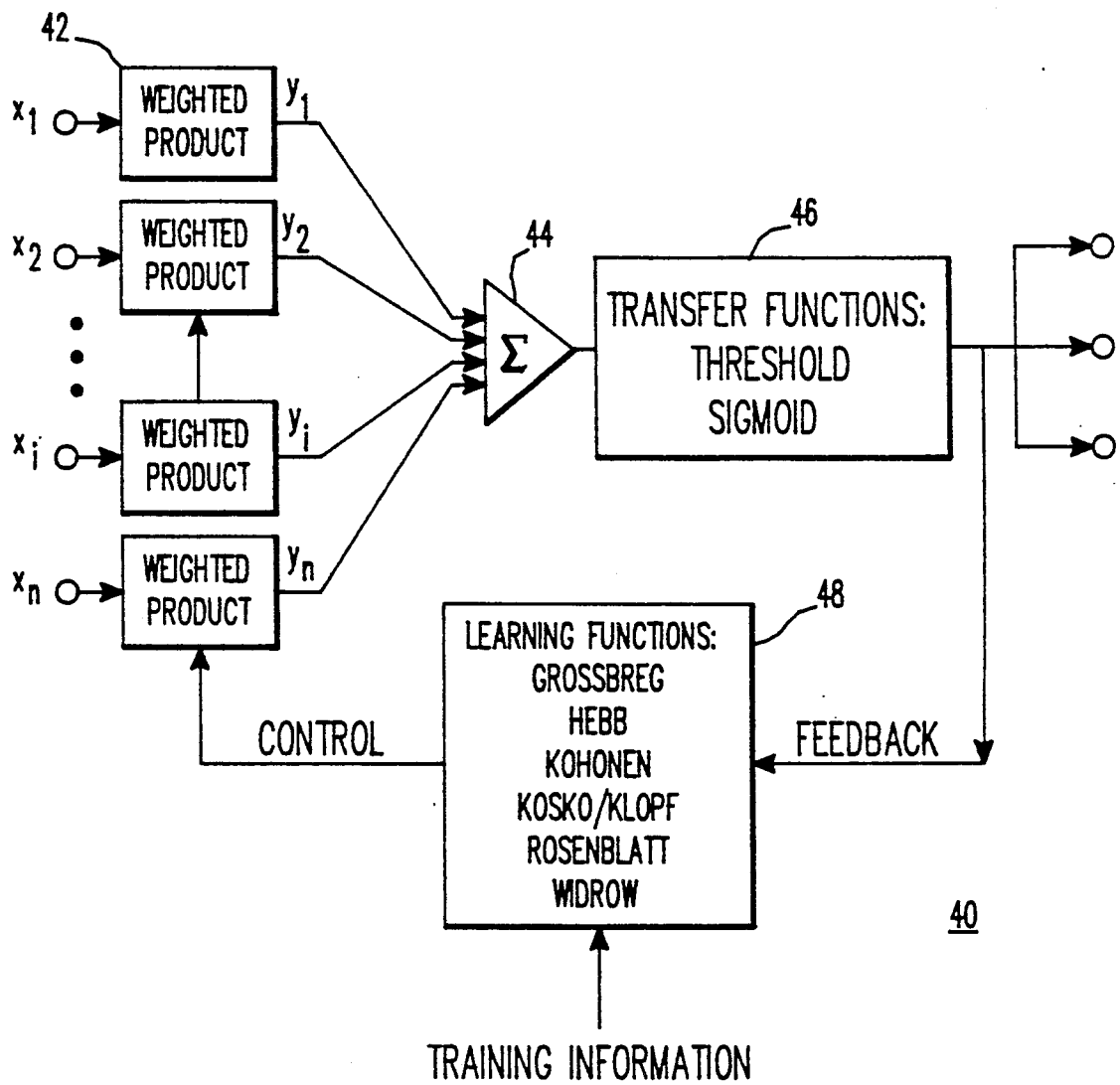
FIG. 2 illustrates a conventional network node.
Figure 8:
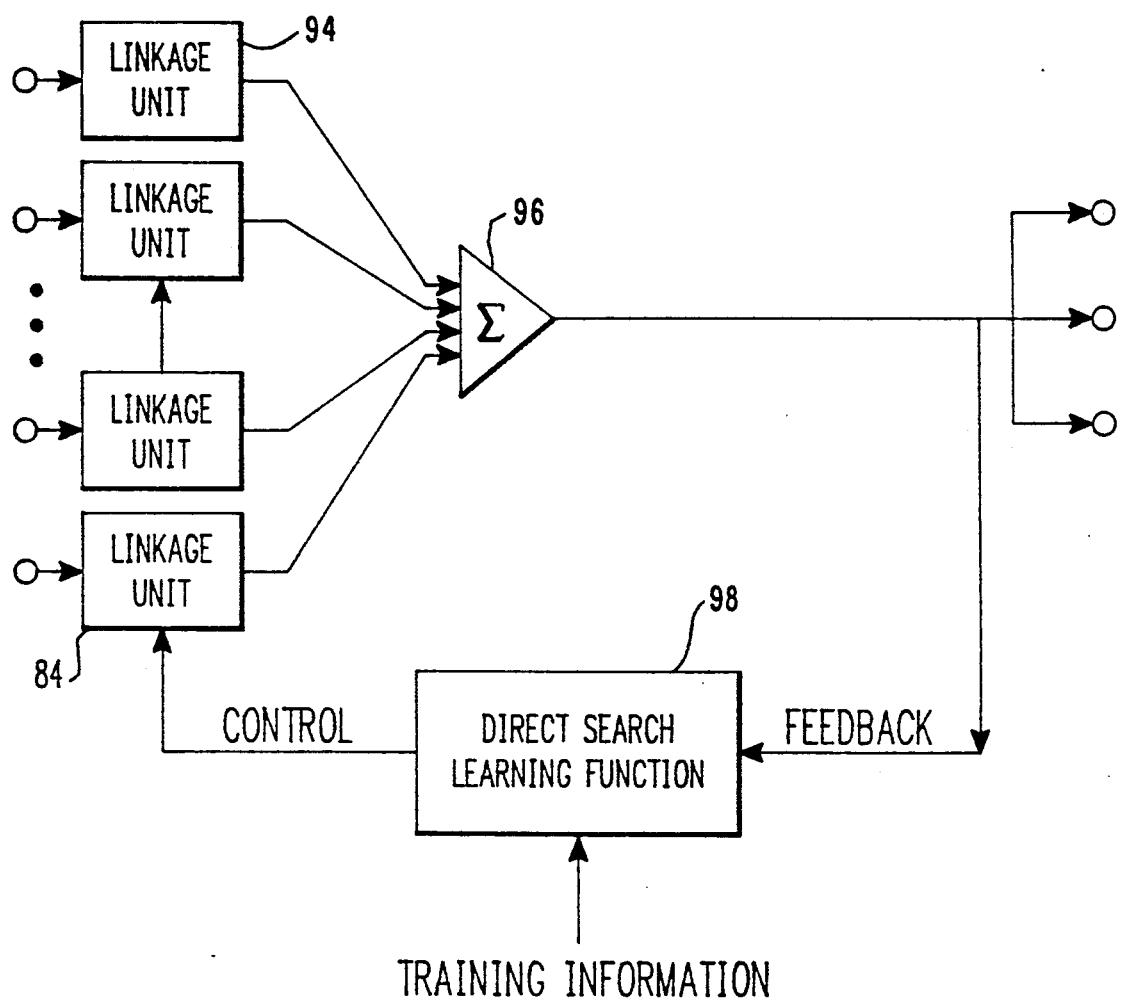
FIG. 8 illustrates the input/output nodes of FIG. 7.

FIG. 8 illustrates a structure of a probability based weighted summation processing element suitable as a node for the input/output layer of the network illustrated in FIG. 7. This element includes a linkage unit 94 performing equations 3 and 4 and a summation unit 96 which adds them together. The learning element 98 function or feedback algorithm will be discussed in more detail later. The conventional neural network processing element operates with boolean signals while the probability based weighted summation processing element is operating with a multi-bit signal, denoted P1, P2 . . . The conventional neural network processing element also requires a transfer function, as illustrated in FIG. 2, where the probability based weighted summation processing element of FIG. 8 does not. This new processing element can be used in probability based neural networks to perform the needed preprocessing or postprocessing function at the input and output layers.

Figure 9:
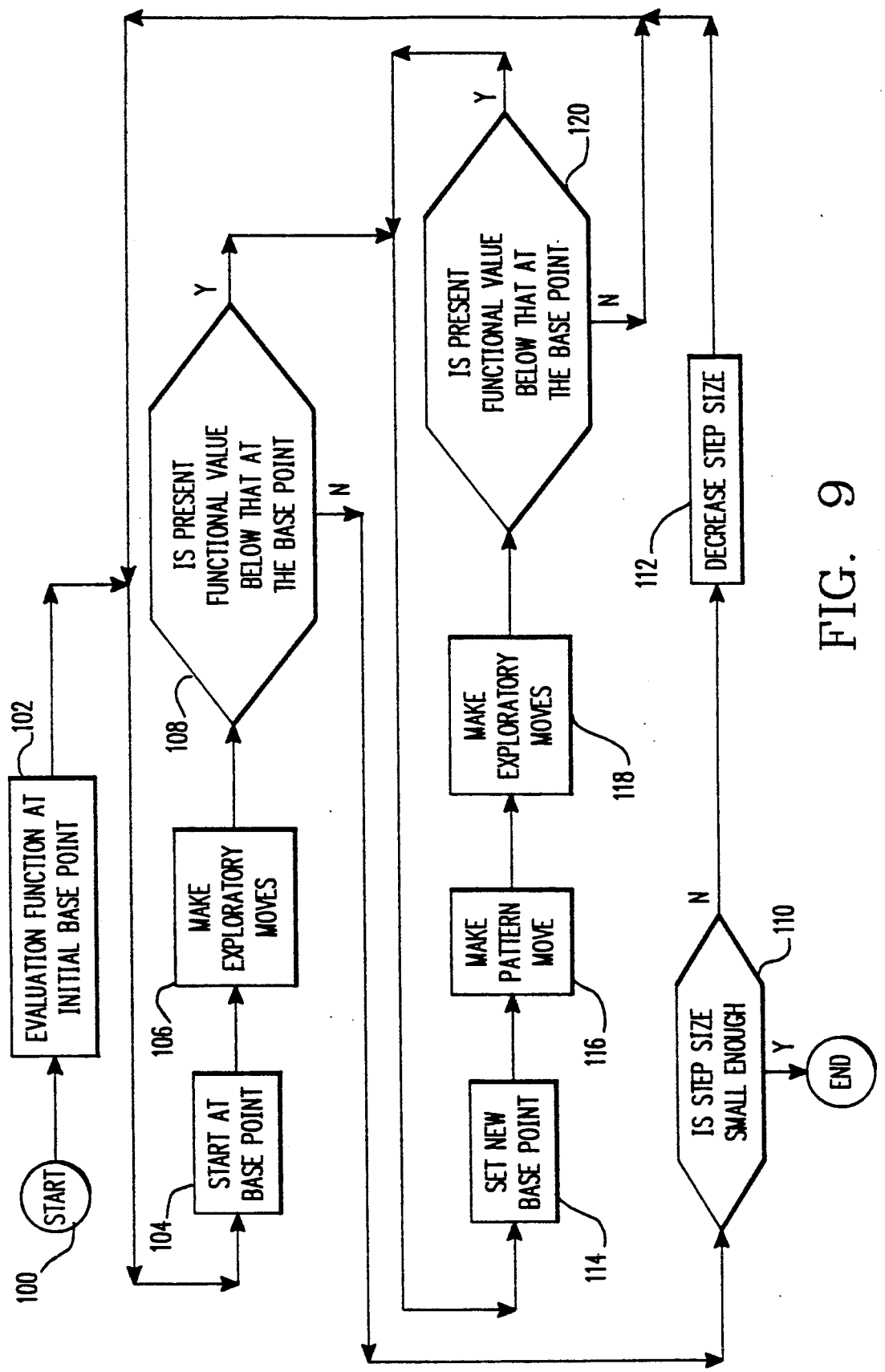
FIG. 9 illustrates the direct search learning algorithm used in the present invention.

A learning algorithm in a neural network provides the neural network with the ability to adapt to changes in the environment by changing the weights applied to the incoming signals. The learning algorithm used (66/88) in the present invention is the Hooke/Jeeves direct search algorithm discussed in Robert Hooke and Terry A. Jeeves (1961) "'Direct Search' Solution of Numerical and Statistical Problems", Journal of the ACM volume 8, pages 212-229, and discussed in more detail in the related optimization application both incorporated by reference herein. This direct search algorithm optimizes the cost function of the network and is faster and more robust than the commonly used delta method of error propagation. The direct search approach will work even if the cost function is discontinuous and even if the parameters of the function take on only a finite set of discrete values. The direct search approach is a strategy for determining a sequence of trial solutions that converge to a problem solution. A particularly successful direct search routine is a pattern search, the flow diagram of which is illustrated in FIG. 9. The pattern search uses two kinds of moves in going from one trial point to the other. The first type is a small, exploratory move designed to acquire knowledge. The second is a large vector move, the pattern move, designed to make progress. The direction chosen for the pattern move is the result of consolidating all the acquired knowledge from previous exploratory and pattern moves. The full strategy and precise tactics for the pattern search is described in the above-mentioned paper. After an execution or diagnostic cycle by the network, the host computer 84 starts 100 by evaluating 102 the function at the initial base point. The learning algorithm then enters a loop which cycles until an appropriate step size for searching is determined. The first step is to start 104 at the base point and make an exploratory move 106. After the exploratory move in changing the weights coefficients of the network is performed an evaluation is made 108. This evaluation determines whether the function value is below that at the base point, that is, this approach looks for a local minimum in the optimal solution. If the present value is not below the base point, a determination is made 110 as to whether or not the step size is small enough. If not the step size is decreased 112 and the loop starts again. If the functional value or cost function is lower, a new base point is set 114 and a pattern move is performed 116. Once the pattern move is performed further exploratory moves are made 118 followed by testing 120 of the function value. A more detailed description of how to use the pattern direct search to determine the weights A and coefficients B used in the nodes of the present invention can be found in the related application directed to neural network optimization.

The previous discussions have concentrated on providing a processing element 60 which performs the product threshold operation of equation 5, the variations in equations 6-10 and equation 11 for input and output operations. These elements can be implemented as multibit discrete buswide components, software routines and special purpose processors. To obtain a very high speed product threshold element operating on linearly transformed input signals, dedicated logic element component nodes 60 can be implemented. The following discussion will describe a binary logic unit for six variations of a programmable dyadic processing element and one version of a programmable systolic processing element which performs the product threshold operations previously discussed. These logic units can be substituted directly for the perceptrons of conventional neural networks.

A dyadic processing element performs the following transformation:

$$\{(a \cdot x + b) \cdot (c \cdot y + d) \geq \Theta\} \rightarrow Z \quad (13)$$

The coefficients a, b, c and d can be represented by up to 2 bits, however, the threshold $\Theta$, the input parameters x and y, and the output variable z can be represented by a single bit. The values of a, b, c and d can be determined from the tables previously discussed or adaptive using the direct search method previously discussed.

Figure 10:
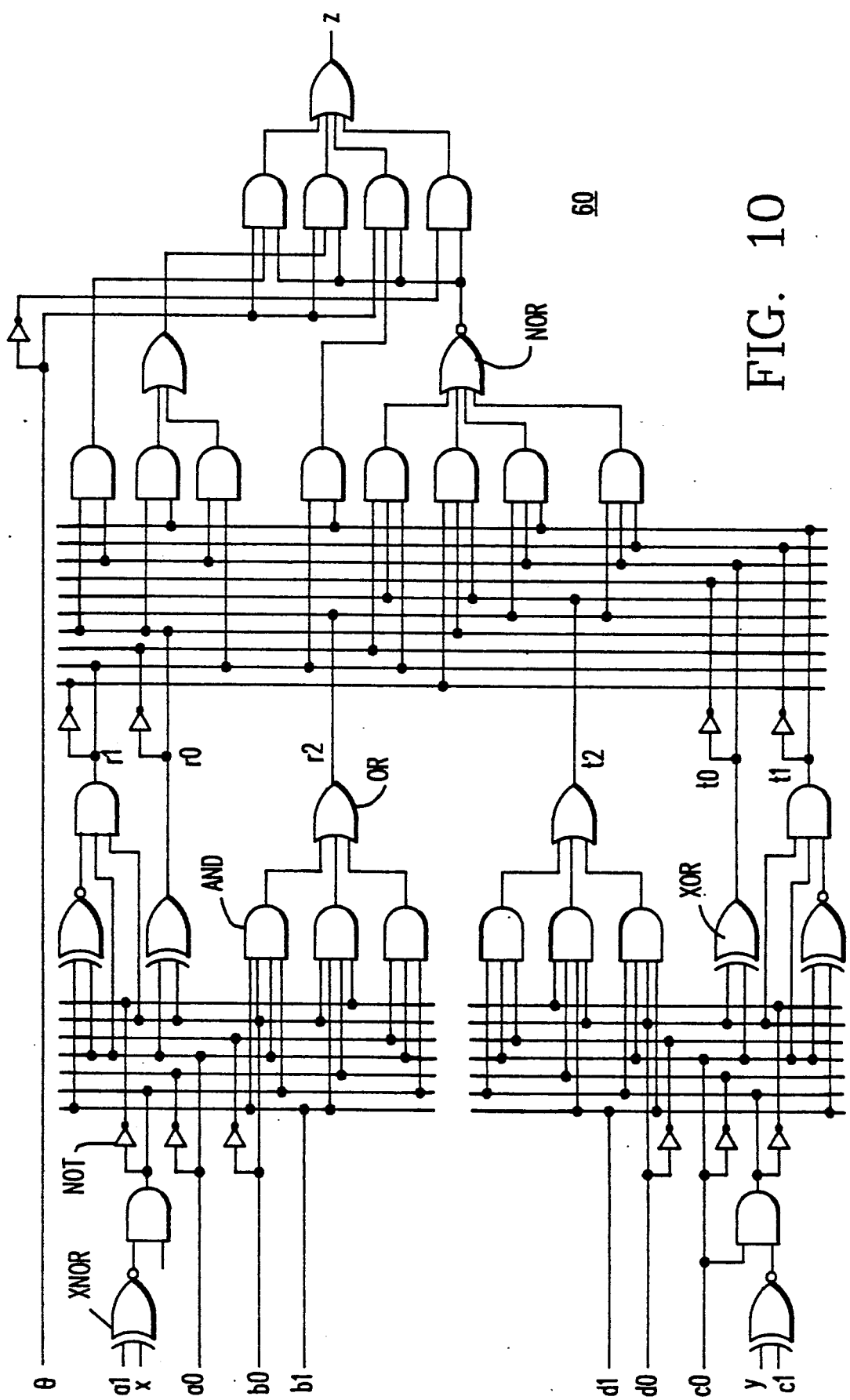
FIGS. 10–16 illustrate dedicated logic element implementations of the node of the present invention.

A full internal representation of the function of equation 13 can be attained by the 33 gate circuit illustrated in FIG. 10. This circuit can operate at 250 million interconnects per second using bipolar technology and 25 million interconnects per second using VLSI technology.

Figure 11:
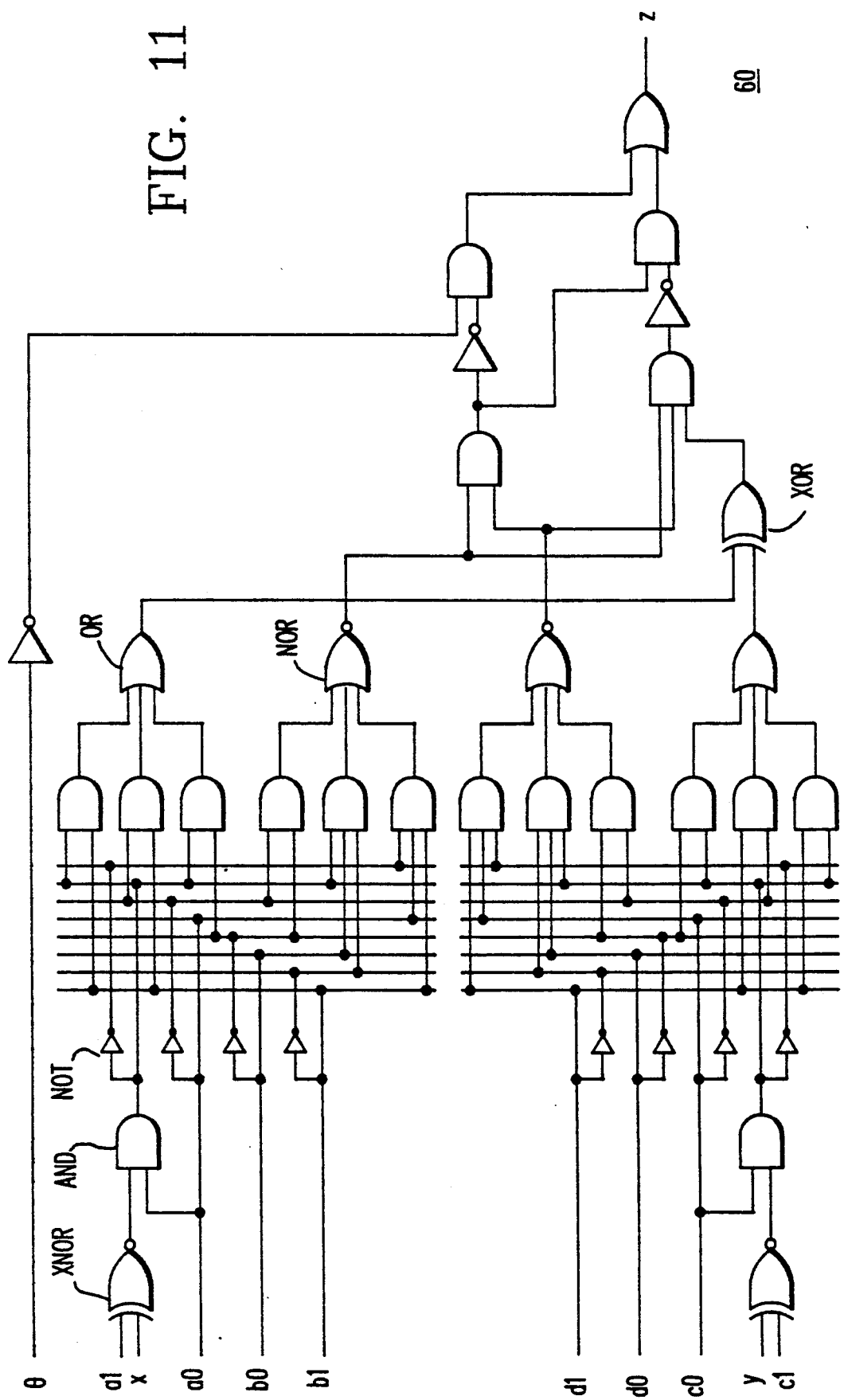

A more compact representation utilizes the signum function operating on the linearly transformed input signals to improve the circuit design. As illustrated in FIG. 11, a 26 gate circuit having a propagation delay of 8 gates will fulfill this objective and can operate at speeds of up to 250 million interconnects per second using bipolar technology and 25 million interconnects per second using VSLI technology.

Figure 12:
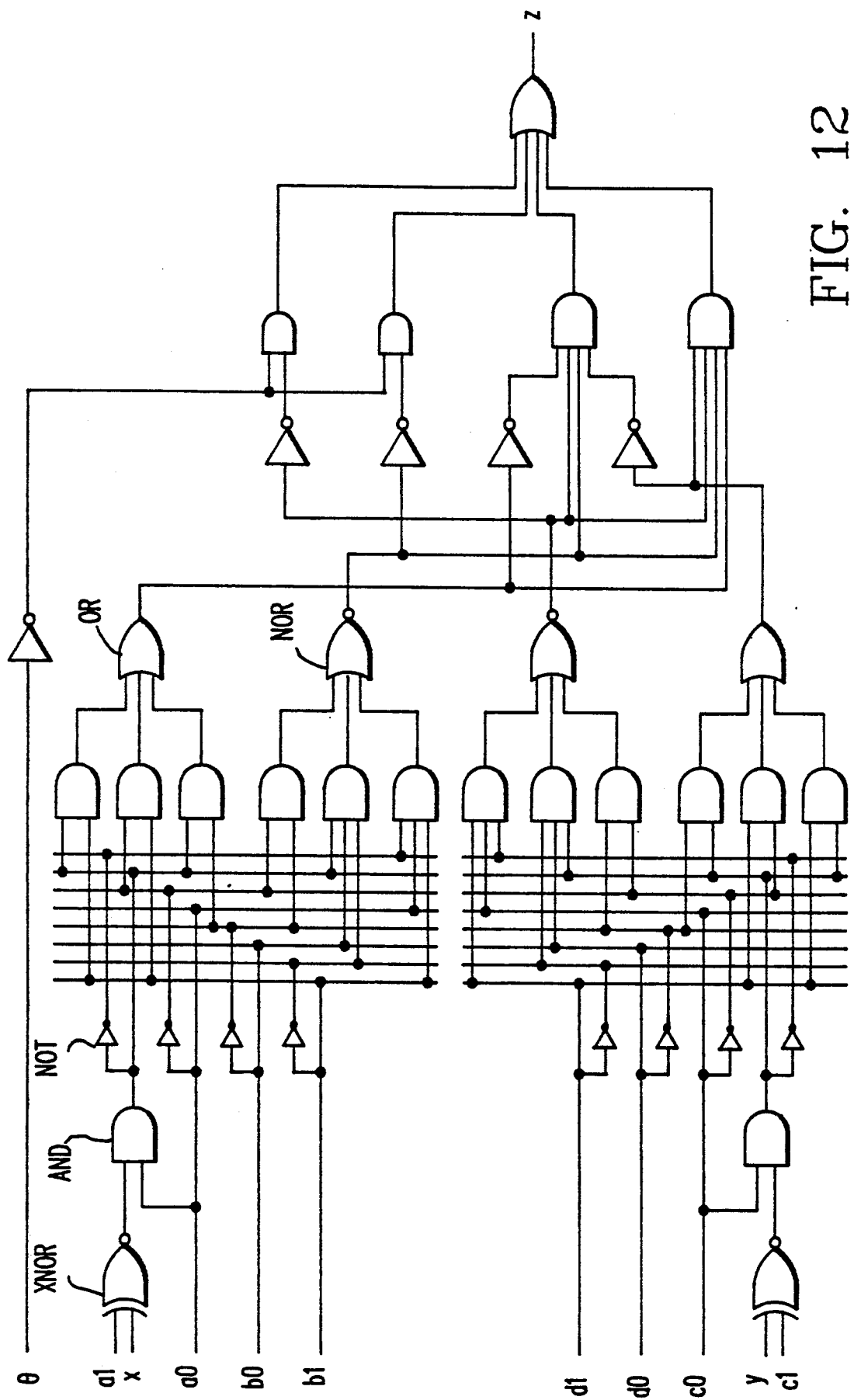

A further improved compact internal representation device combines the output stages to reduce the gate count and speed up processing. As illustrated in FIG. 12, a 25 gate circuit having a propagation delay of 6 gates which executes equation 13 is provided which can operate at speeds of up to 330 million interconnects per second using bipolar technology and 33 million interconnects per second using VLSI technology.

Figure 13:
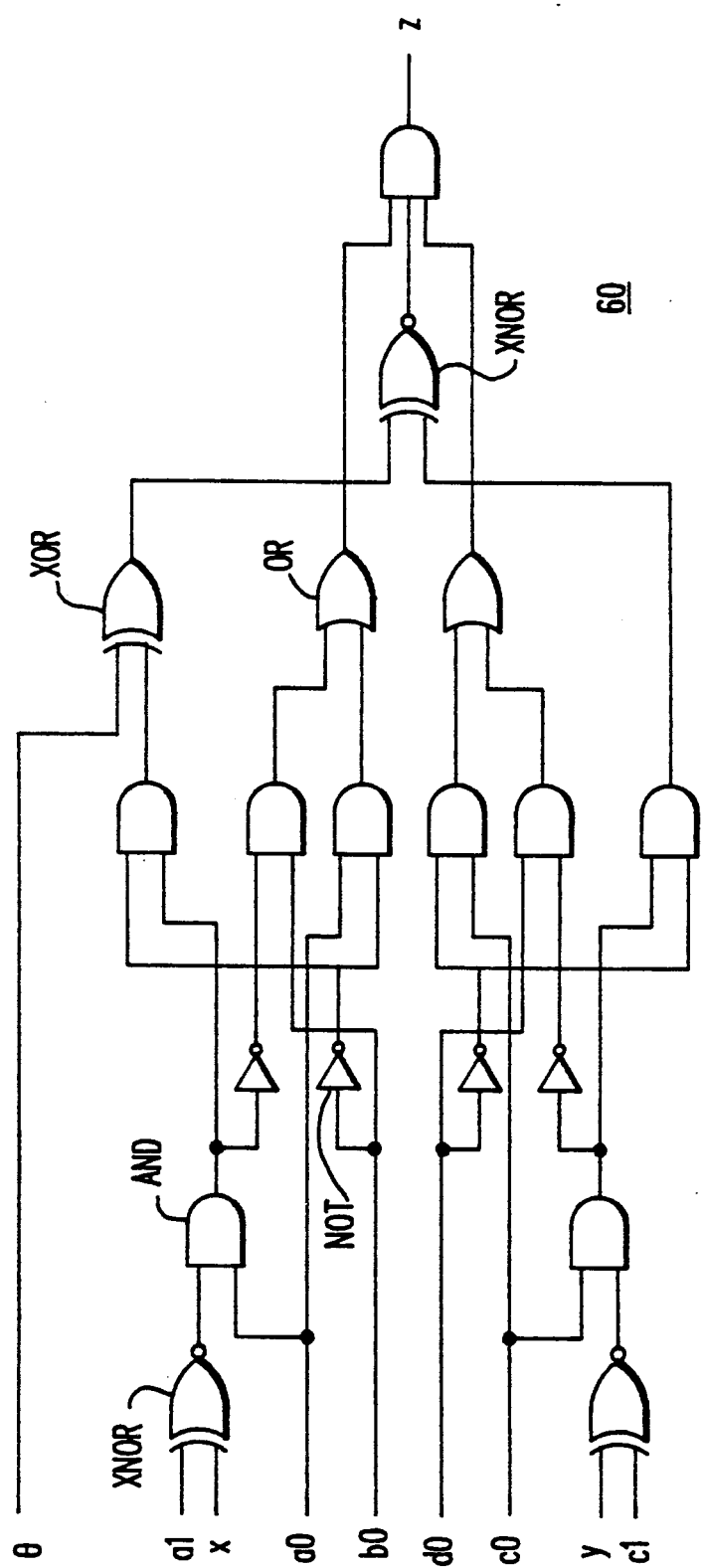

A specialized compact internal representation can be created as illustrated in FIG. 13, in which the input stage has been modified and the output stages combined to reduce gate count. This is a 15 gate circuit and has the same gate delay and speed characteristics as FIG. 12 but occupies less real estate.

A further/programmable logic processing element which executes equation 13 combines the input stages to perform a flash linear transformation. The output stages have also been combined to increase speed. The FIG. 14 implementation is a 19 gate circuit having a propagation delay of 4 gates capable of operating at speeds up to 500 million interconnects per second using bipolar technology and 50 million interconnects per second using VLSI technology.

Figure 14:
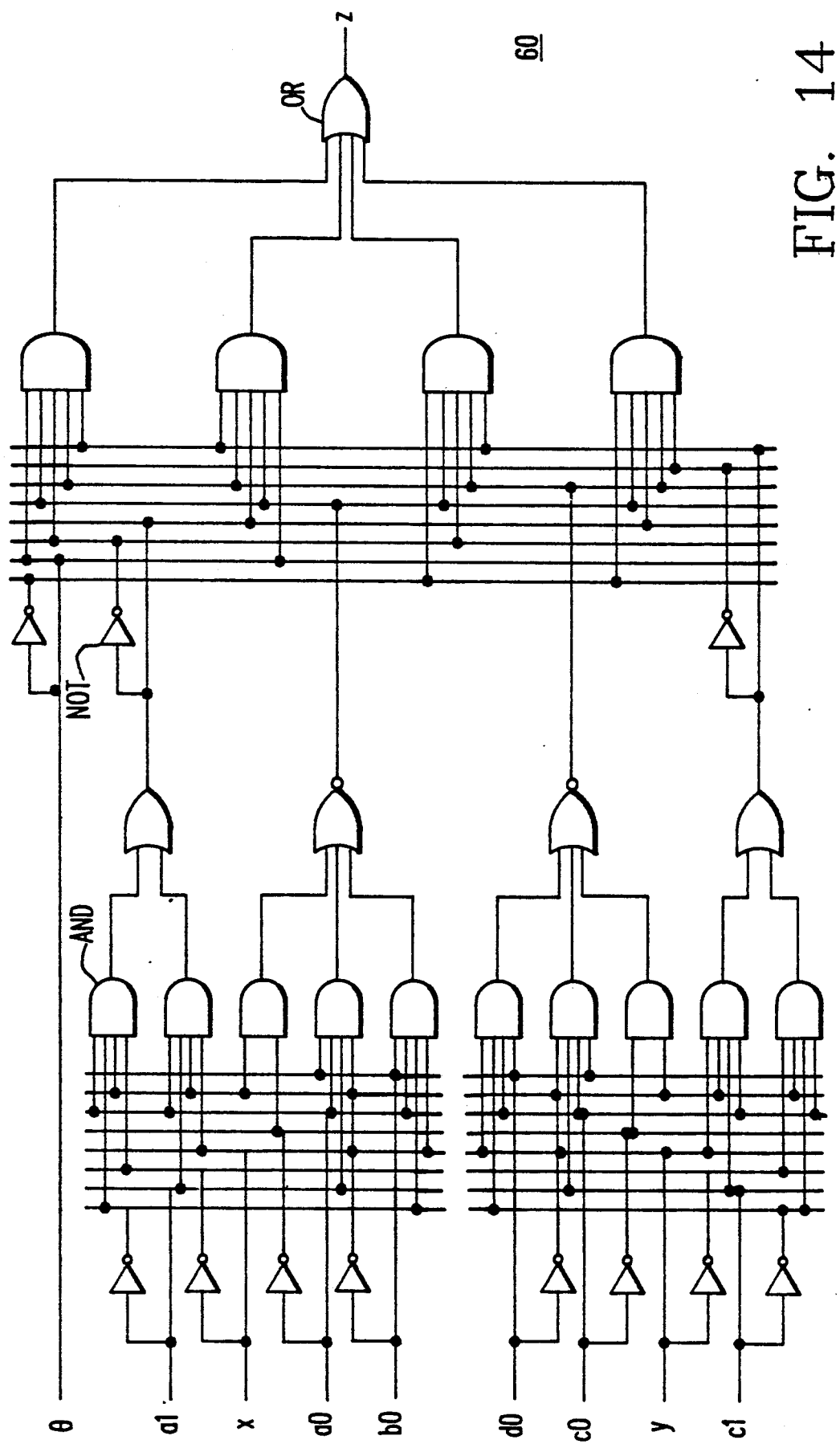
Figure 15:
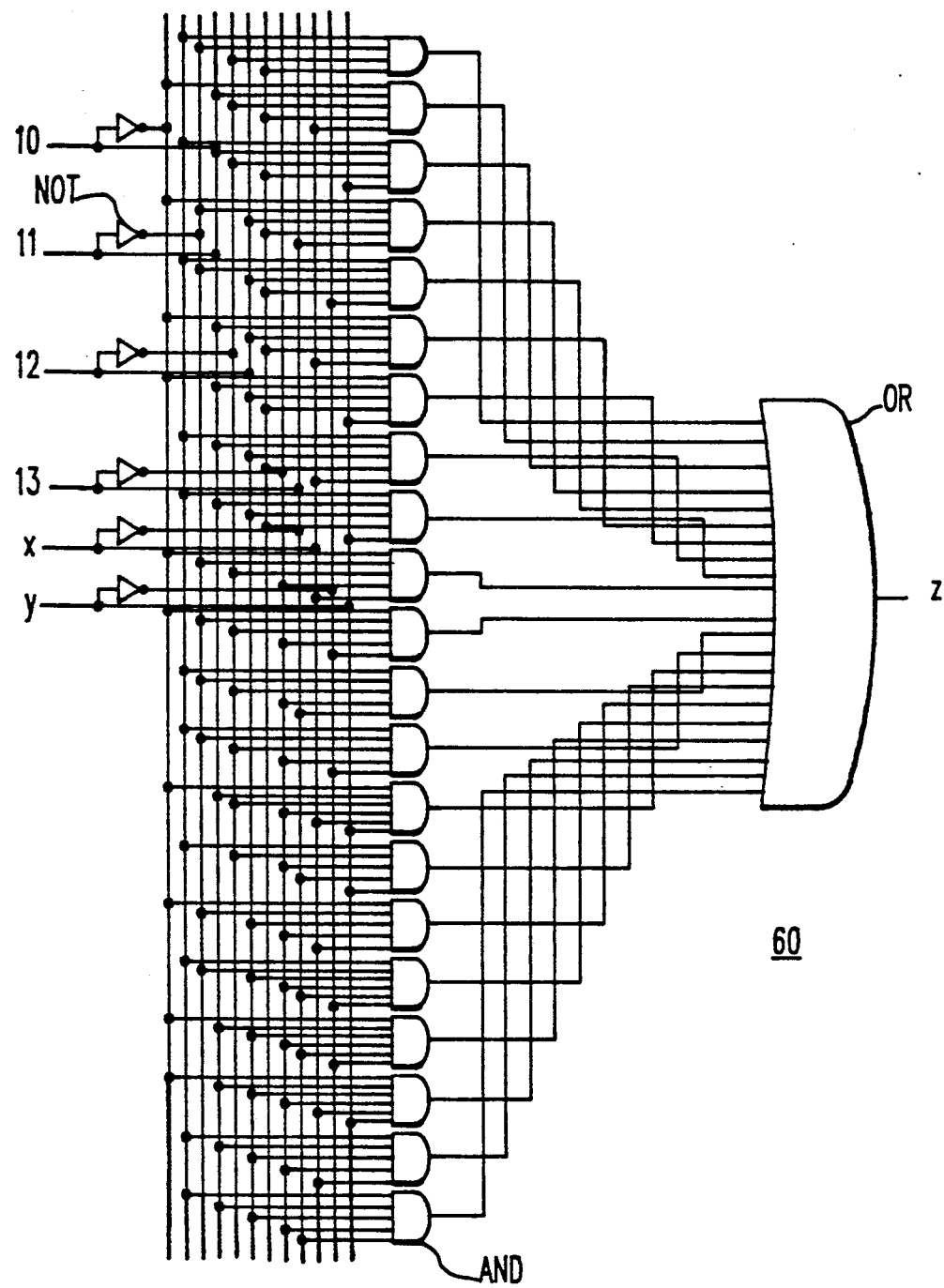

The increased combination of the stages as illustrated in FIGS. 10–14 ultimately produces a table look-up programmable logic processing element which performs the operation of equation 13 and which is illustrated in FIG. 15. The INST inputs select the functions in Table 3 that are performed. This neural node element results in increased speed, a reduction in the number of input lines and produces a 22 gate circuit having a propagation delay of 2 gates capable of operating at speeds of up to one billion interconnects per second using bipolar technology and 100 million interconnects per second using VLSI technology. The table look-up approach, although very fast, is not suitable as a multi-input processing element because the circuit size grows with the number of inputs and the desired number of output combinations.

Figure 16:
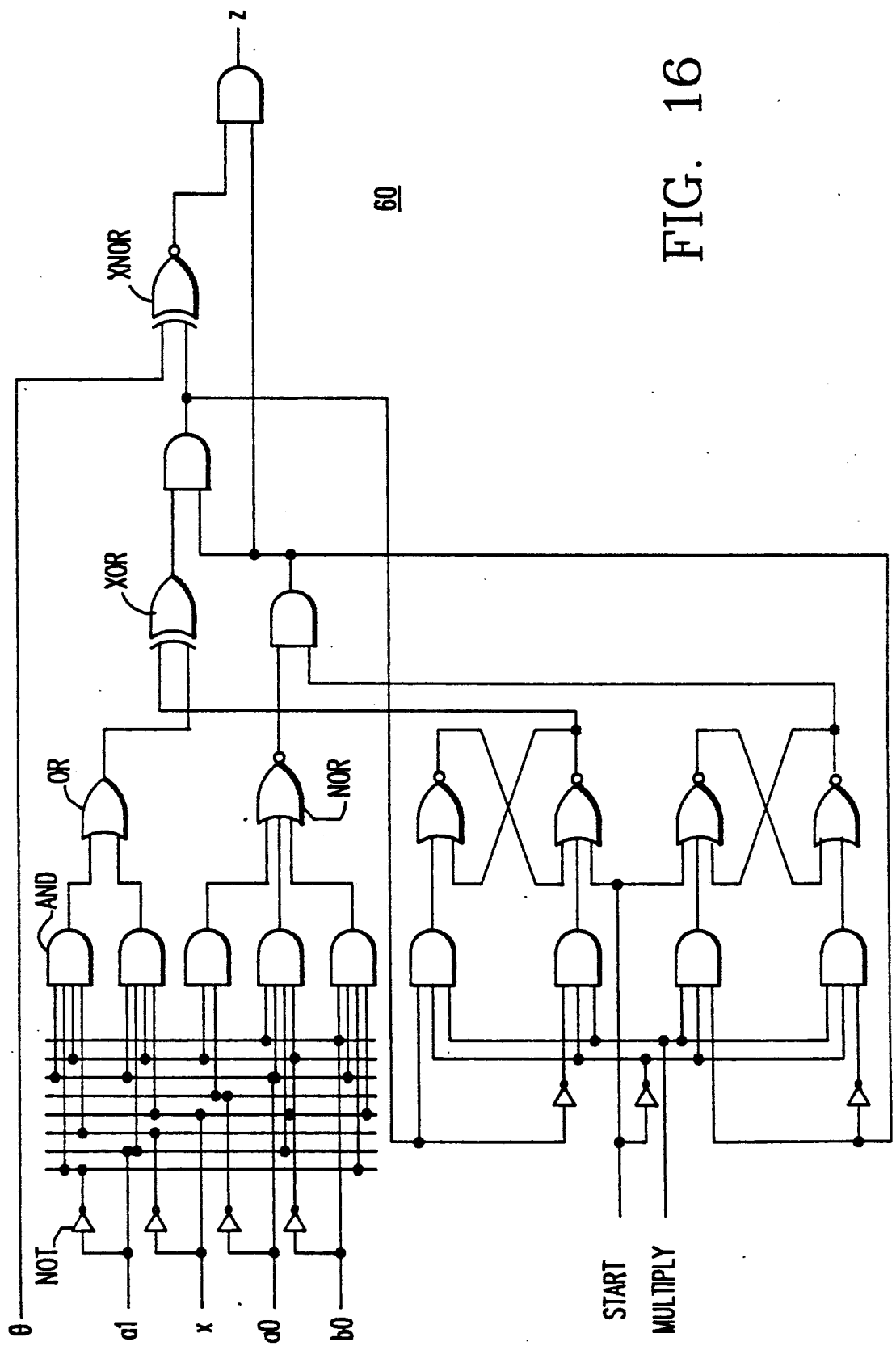

The flash programmable logic processing element of FIG. 15 does have a feature that can be used in building a multi-input processing element, the flash linear transformation. The linear transformation is central to the algorithm and must be implemented in a systolic device as illustrated in equation 14.

$$\left\{ (-1)^{\Theta} \prod_{i=1}^{n} \text{signum}(a_i x_i + b_i) \geq 1 \right\} \rightarrow z \quad (14)$$

where the signum function returns a 0 if its argument is 0, returns a 1 if its argument is positive and returns a $-1$ if its argument is negative. The linear transformation coefficients $a_i$ can be represented by 2 bits, whereas the sign control $\Theta$, the input parameters $x_i$, the linear transformation offsets $b_i$ and the output variable z can be represented by 1 bit each. As illustrated in FIG. 16, a 20 gate circuit having a propagation delay of 4 gates per input plus 2 gates at the output will produce a 32 input device capable of performing the function of equation 14. The top half of this circuit performs a linear transformation on the input x and multiplies by previous results stored in the bottom half. During operation the sign and magnitude of the previous operation are stored in the flip-flops. When the next input group is loaded, the result is processed and multiplied by the contents of the flip-flops, when the multiply input is toggled. The start input initializes the flip-flops with a magnitude of 1 and a sign of 0. As can be seen, this circuit is a systolic element with the top half doing the processing and the bottom half acting as a memory. A circuit as illustrated in FIG. 16 can perform a neural net interconnection at speeds of up to 240 million interconnections per second using bipolar technology and 24 million interconnects per second using VLSI technology.

Figure 1:
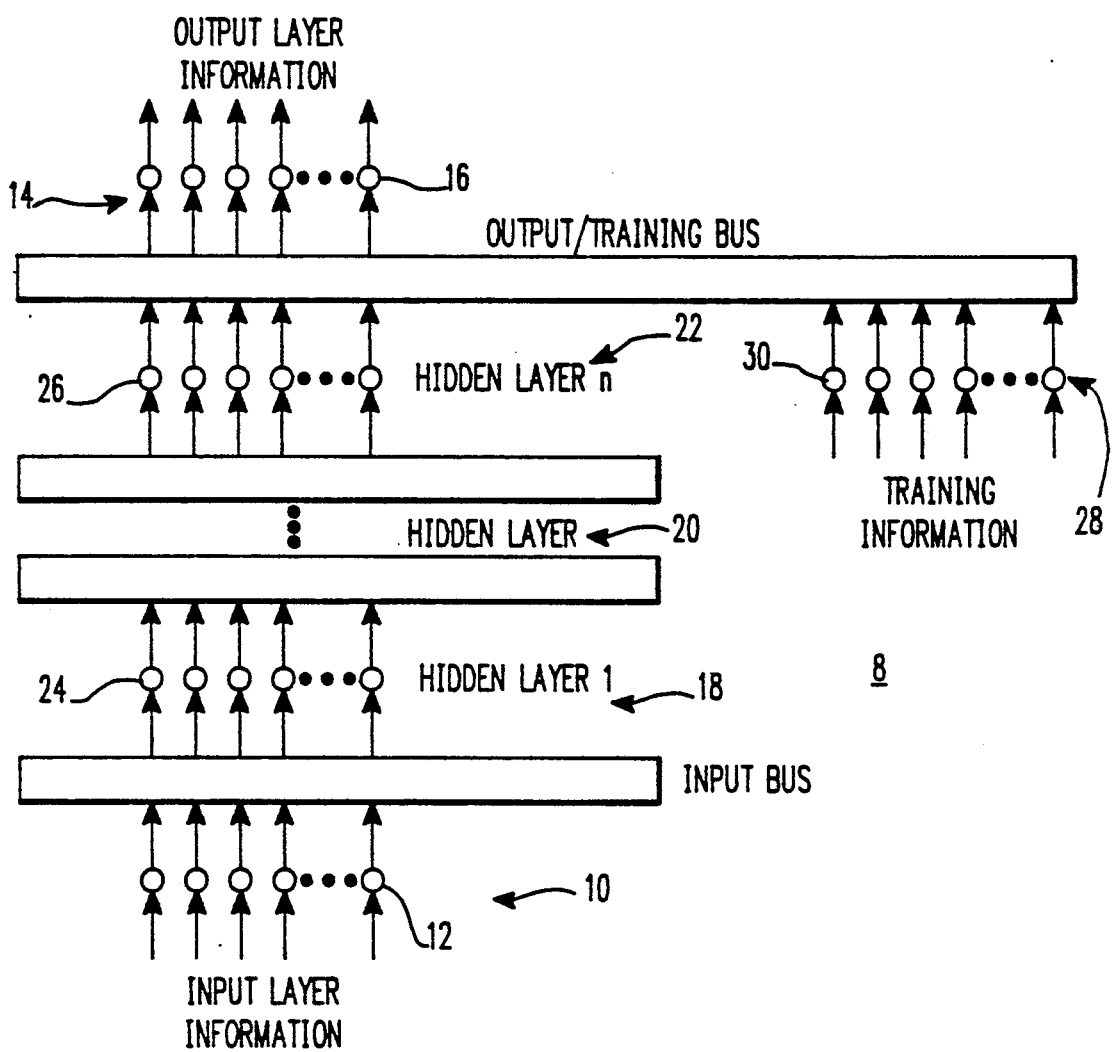
FIG. 1 illustrates a conventional neural network.

At 50,000 gates per chip, 128 processing elements on a single chip are possible with enough storage for 32 interconnects per processing element. As a result, the design of the present invention as illustrated in FIG. 16 achieves on one chip what 10 or more state of the art neural network chips do. Networks using the processing elements in FIGS. 10–16 can be rapidly prototyped by using programmable gate arrays such as those made by Xilinx of San Jose Calif. As a result, the node design of FIG. 16 is ideal for the parallel processing in the neural networks illustrated by FIGS. 1, 4 and 7. Table 9 compares the processing element configurations of FIGS. 10–16.

TABLE 9

| Circuit Config. | Comparison of Processing Element Characteristics | | | | | |
|---|---|---|---|---|---|---|
| | Gate Count | Delay (Gates) | Bipolar (Mhz) | Interconnection Speed | | |
| | | | | VLSI (Mhz) | Size (Gates) | Merit (Gates/Mhz) |
| Full Internal Repres. | 33 | 8 | 250 | 25 | 47.0 | 1.96 |
| Compact Internal Repres. | 26 | 8 | 250 | 25 | 36.0 | 1.50 |
| Improved Compact Internal Repres. | 25 | 6 | 330 | 33 | 38.0 | 1.19 |
| Special. Compact Internal Repres. | 15 | 6 | 330 | 33 | 17.5 | 0.55 |
| Flash Programmable Logic Processing Element | 19 | 4 | 500 | 50 | 40.5 | 0.81 |
| Table Loop-up Programmable Logic P.E. | 22 | 2 | 1000 | 100 | 69.5 | 0.70 |
| Programmable Systolic P.E. (for 32 Inputs) | 20 | 130 | 240 | 24 | 31.0 | 1.29 |

If speed is essential and real estate is unimportant, then the table look-up programmable logic processing element of FIG. 15 is the best choice for a dyadic processing element. If real estate is essential and speed is unimportant, then the specialized compact internal representation of FIG. 13 is the best choice. If speed and real estate are equally important, then the flash programmable logic processing element of FIG. 14 is the best choice. For three or more inputs, the programmable systolic processing element of FIG. 16 is the best choice for minimizing real estate. For three or more inputs, if speed is essential and real estate is unimportant, then a table look-up processing element as, illustrated in FIG. 15, is the best choice.

The processing elements described herein not only can be used to improve probabilistic reasoning for traditional AI (expert) systems or neural network systems, but also provides a mechanism for spatial combination of information or signals for image recognition, 2D or 3D imaging, radar tracking, magnetic resonance imaging, sonar tracking and seismic mapping.

This disclosure has presented a processing element for building neural networks. This processing element performs a product on linear transformed input signals. It is designed to build compact, high speed neural networks. This processing element is vastly superior to the conventional neural network processing element, the perceptron, because it generates both linearly separable and non-linearly separable boolean logic functions. The universality associated with the power series transformation version of the processing element leads to a two layer neural network solution to any arbitrary decision making function. This is a significant improvement over the three layer neural network solution needed to solve arbitrary decision making problems using conventional neural network processing elements. The lack of a hidden layer of processing elements in the neural network solution of the present invention, the corresponding reduction in the total number of processing elements, and the sheer simplicity of the algorithm implemented by the universal processing element, make neural networks utilizing this universal processing element extremely compact and very high in speed. The adaptive probabilistic reasoning system discussed herein differs from current neural networks in that (1) the processing element performs a product instead of generating a continuously differentiable output based upon summing the inputs and a predefined threshold, (2) the interconnections between the processing elements are linear transformations or power series transformations instead of a simple weighting of the information flowing through the interconnection, (3) the expert system can be organized as columns of binary trees, a highly structured arrangement or of two layers, rather than at least three layers of massively interconnected processing elements, a less structured arrangement, and thereby allows verification and validation and, (4) the use of a direct search optimization instead of gradient optimization allows convergence to a solution much quicker. The dedicated logic gate implementations of the neural nodes provide substantially increased speed over the general purpose implementations, and as a result are applicable to very high speed neural network problems.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A neural network element, comprising:

a digital input circuit for performing a digital linear or power series transformation on digital input values; and a digital combining circuit for digitally combining the transformed input values and producing a neural node signal.

2. A neural network element, comprising:
a digital input circuit for digitally power series transforming a digital input value; and
a digital combining circuit for digitally producing a product of the transformed digital input.

3. An element as recited in claim 2, wherein said digital input circuit digitally performs:

$$\sum_{k=i}^{m} A_{ik} x_i^k$$

where $x_i$ are the input values and $A_{ik}$ are constants.

4. A neural network element, comprising:
a digital input circuit for digitally linear transforming digital input values; and
a digital combining circuit for producing a product of the transformed digital input values and outputting a neural node signal.

5. An element as recited in claim 4, wherein said digital input circuit and said digital combining circuit digitally perform $$\prod_{i=1}^{n} (A_i x_i + B_i) \geq \Theta$$

where $x_i$ are the input values, $A_i$ an $B_i$ are constant coefficients and $\Theta$ is the threshold.

6. An element as recited in claim 5, further comprising feedback means for teaching said element a pattern using a direct search.

7. A neural network element, comprising:
a digital input circuit for linearly digitally transforming digital input values in accordance with $y_i = A_i x_i B_i$, where $x_i$ is the input value, $A_i$ and $B_i$ are constants and $y_i$ is the transformed value;
a digital combining circuit for combining the linear transformed values in accordance with $$y = \prod_{i=1}^{n} y_i$$

where y is the combined value;
a digital comparison circuit for comparing the combined value with a threshold and producing a neural node output signal when the threshold is satisfied; and
a digital teaching device for determining the values of the constants using a direct search.

8. A neural network, comprising:
first and second neural node layers interconnected with each other, each node in the layer comprising:
a digital transfer circuit for digitally performing $$\prod_{i=1}^{n} (A_i x_i + B_i) \geq \Theta$$

where $x_i$ are digital input values, $A_i$ and $B_i$ are transfer coefficients and $\Theta$ is a threshold.

9. A network as recited in claim 8, further comprising a digital learning device for determining the values of the transfer coefficients by a direct search.

10. A network as recited in claim 9, wherein said digital transform node circuits are coupled as a binary tree.

11. An adaptive reasoning system, comprising:
an input layer comprising digital input node circuits, each digital input node circuit for digitally performing $$\sum_{i=1}^{n} A_i x_i$$

where $A_i$ is a constant and $x_i$ is a digital input value;
a binary tree transform layer coupled to said input layer, and comprising digital transform node circuits, each digital transform node circuit for digitally performing $$\prod_{i=1}^{n} (B_i y_i + C_i)$$

where $B_i$ and $C_i$ are transform coefficients and $y_i$ is a value from one of the input nodes; and
an output layer coupled to said transform layer and comprising digital output node circuits, each digital output node for performing $$\sum_{i=1}^{n} D_i z_i$$

where $D_i$ is a constant and $z_i$ is a value from one of the transform nodes.

12. A system as recited in claim 11, further comprising learning means, coupled to said transform layer, for determining the transform coefficients by a direct search.

13. A neural network dyadic processing element, comprising:
digital inputs for inputting first and second single bit signals; and
a digital logic circuit for digitally performing $$\{(a \cdot x + b) \cdot (c \cdot y + d) \geq \Theta\} \rightarrow z$$

where a, b, c and d are two bit coefficients, x and y are the first and second single bit input signals, $\Theta$ is a single bit threshold and z is a single digital bit output.

14. A neural network systolic dyadic processing element, comprising:
a digital logic circuit for digitally performing $$\left\{ (-1)^{\Theta} \prod_{i=1}^{n} \mathrm{signum}(a_i x_i + b_i) \geq 1 \right\} \rightarrow z$$

where $a_i$ is a two bit digital linear transformation coefficient, $b_i$ is a single digital bit linear transformation coefficient, $\Theta$ is a single digital bit sign control, $x_i$ is the single digital bit input signal and z is a single digital bit output.

* * * * *